United States Patent
Friesen et al.

(10) Patent No.: US 11,900,226 B2
(45) Date of Patent: **\*Feb. 13, 2024**

(54) SYSTEMS FOR CONSTRUCTING HIERARCHICAL TRAINING DATA SETS FOR USE WITH MACHINE-LEARNING AND RELATED METHODS THEREFOR

(71) Applicant: SOURCE GLOBAL, PBC, Scottsdale, AZ (US)

(72) Inventors: Cody Alden Friesen, Fort McDowell, AZ (US); Paul Bryan Johnson, Phoenix, AZ (US); Heath Lorzel, Mesa, AZ (US); Kamil Salloum, Tempe, AZ (US); Jonathan Edward Goldberg, Phoenix, AZ (US); Grant Harrison Friesen, Scottsdale, AZ (US); Jason Douglas Horwitz, Mesa, AZ (US)

(73) Assignee: SOURCE GLOBAL, PBC, Scottsdale, AZ (US)

( \* ) Notice: Subject to any disclaimer, the term of this patent is extended or adjusted under 35 U.S.C. 154(b) by 68 days.

This patent is subject to a terminal disclaimer.

(21) Appl. No.: 17/666,442

(22) Filed: Feb. 7, 2022

(65) Prior Publication Data
US 2022/0156648 A1    May 19, 2022

Related U.S. Application Data

(63) Continuation of application No. 16/211,896, filed on Dec. 6, 2018, now Pat. No. 11,281,997.
(Continued)

(51) Int. Cl.
G06N 20/00    (2019.01)
G05B 13/02    (2006.01)
(Continued)

(52) U.S. Cl.
CPC ......... G06N 20/00 (2019.01); G05B 13/0265 (2013.01); G05B 17/02 (2013.01); G06N 3/08 (2013.01); *G06N 3/045* (2023.01)

(58) Field of Classification Search
CPC ........ G06N 20/00; G06N 3/08; G06N 3/0454; G06N 3/045; G05B 13/0265; G05B 17/02
(Continued)

(56) References Cited

U.S. PATENT DOCUMENTS

| 1,816,592 A | 7/1931 | Knapen |
| 2,138,689 A | 11/1938 | Altenkirch |

(Continued)

FOREIGN PATENT DOCUMENTS

| CN | 1774401 | 5/2006 |
| CN | 1325854 | 7/2007 |

(Continued)

OTHER PUBLICATIONS

Non-Final Office Action dated Jan. 17, 2020 in U.S. Appl. No. 15/528,366.
(Continued)

*Primary Examiner* — Dave Misir
(74) *Attorney, Agent, or Firm* — Snell & Wilmer L.L.P.

(57) ABSTRACT

Some embodiments include a system operable to construct hierarchical training data sets for use with machine-learning for multiple controlled devices. Other embodiments of related systems and methods are also provided.

18 Claims, 9 Drawing Sheets

Related U.S. Application Data

(60) Provisional application No. 62/595,445, filed on Dec. 6, 2017.

(51) Int. Cl.
  *G06N 3/08* (2023.01)
  *G05B 17/02* (2006.01)
  *G06N 3/045* (2023.01)

(58) Field of Classification Search
  USPC .......................................................... 706/12
  See application file for complete search history.

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 11,359,356 B2 | 6/2022 | Friesen et al. |
| 2002/0130091 A1 | 9/2002 | Ekberg et al. |
| 2003/0091881 A1 | 5/2003 | Eisler |
| 2003/0101161 A1* | 5/2003 | Ferguson ............. G06K 9/6256 |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1* | 6/2007 | Igelnik ................... G05B 17/02 |
| | | 706/15 |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |

(56) References Cited

U.S. PATENT DOCUMENTS

| | | |
|---|---|---|
| 2010/0275775 A1 | 11/2010 | Griffiths et al. |
| 2010/0294672 A1 | 11/2010 | Gahr et al. |
| 2010/0300868 A1 | 12/2010 | Pirone |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0053580 A1 | 2/2014 | Ferreira et al. |
| 2014/0110273 A1 | 4/2014 | Bar-Or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0260389 A1 | 9/2014 | Sistla |
| 2014/0317029 A1* | 10/2014 | Matsuoka .............. G05B 15/02 706/12 |
| 2015/0033774 A1 | 2/2015 | Ferreira et al. |
| 2015/0136666 A1 | 5/2015 | Zamir et al. |
| 2015/0194926 A1 | 7/2015 | Bushong, Jr. |
| 2016/0073589 A1 | 3/2016 | McNamara |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0209346 A1 | 7/2016 | Brondum et al. |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0323221 A1* | 11/2017 | Chaudhuri ............. G06N 20/00 |
| 2017/0354920 A1* | 12/2017 | Switzer ............. B01D 53/0454 |
| 2017/0371544 A1* | 12/2017 | Choi ..................... G06F 3/0685 |
| 2018/0043295 A1 | 2/2018 | Friesen et al. |
| 2018/0209123 A1 | 7/2018 | Bahrami et al. |
| 2019/0025273 A1 | 1/2019 | Brondum |
| 2019/0102695 A1* | 4/2019 | Biswas ................ G06F 13/102 |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0049682 A1 | 2/2020 | Fukuzawa et al. |
| 2020/0055753 A1 | 2/2020 | Minor et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0286997 A1 | 9/2020 | Wu et al. |
| 2020/0300128 A1 | 9/2020 | Friesen et al. |
| 2021/0062478 A1 | 3/2021 | Friesen et al. |
| 2021/0192368 A1* | 6/2021 | Schall .................... G06N 20/00 |
| 2021/0305935 A1 | 9/2021 | Friesen et al. |
| 2022/0039341 A1 | 2/2022 | Friesen et al. |
| 2022/0127172 A1 | 4/2022 | Friesen et al. |
| 2022/0136270 A1 | 5/2022 | Gamboa et al. |
| 2022/0156648 A1 | 5/2022 | Friesen et al. |
| 2022/0176314 A1 | 6/2022 | Friesen et al. |

FOREIGN PATENT DOCUMENTS

| | | | |
|---|---|---|---|
| CN | 101589282 | 11/2009 | |
| CN | 102042645 | 5/2011 | |
| CN | 102297503 | 12/2011 | |
| CN | 102422089 | 4/2012 | |
| CN | 102441320 | 5/2012 | |
| CN | 102733451 | 10/2012 | |
| CN | 202850099 | 4/2013 | |
| CN | 103889892 | 6/2014 | |
| CN | 203777907 | 8/2014 | |
| CN | 104813107 | 7/2015 | |
| CN | 204510348 U | 7/2015 | |
| CN | 105531547 | 4/2016 | |
| DE | 4215839 | 11/1993 | |
| EP | 1139554 | 10/2001 | |
| EP | 2305362 | 4/2011 | |
| EP | 2326890 | 6/2011 | |
| FR | 2813087 | 2/2002 | |
| JP | H06142434 | 5/1994 | |
| JP | H09285412 | 10/1997 | |
| JP | 2002-126441 | 5/2002 | |
| JP | 2002126441 | 5/2002 | |
| JP | 2003-148786 | 5/2003 | |
| JP | 2003148786 | 5/2003 | |
| JP | 2012101169 | 5/2012 | |
| KR | 20000003525 | 2/2000 | |
| WO | 1999007951 | 2/1999 | |
| WO | 2006129200 | 12/2006 | |
| WO | 2007041804 | 4/2007 | |
| WO | 2007051886 | 5/2007 | |
| WO | 2008018071 | 2/2008 | |
| WO | 2009043413 | 4/2009 | |
| WO | 2012009024 | 1/2012 | |
| WO | 2012128619 | 9/2012 | |
| WO | 2012162760 | 12/2012 | |
| WO | 2013026126 | 2/2013 | |
| WO | 2013182911 | 12/2013 | |
| WO | 2014085860 | 6/2014 | |
| WO | 2015054435 | 4/2015 | |
| WO | 2016053162 | 4/2016 | |
| WO | 2016081863 | 5/2016 | |
| WO | WO-2016081863 A1 * | 5/2016 | ......... B01D 53/0454 |
| WO | 2016138075 | 9/2016 | |
| WO | 2016187709 | 12/2016 | |
| WO | 2017177143 | 10/2017 | |
| WO | 2017201405 | 11/2017 | |
| WO | 2019014599 | 1/2019 | |
| WO | 2019050861 | 3/2019 | |
| WO | 2019050866 | 3/2019 | |
| WO | 2019071202 | 4/2019 | |
| WO | 2019113354 | 6/2019 | |
| WO | 2019161339 | 8/2019 | |
| WO | 2020082038 | 4/2020 | |
| WO | 2020086621 | 4/2020 | |
| WO | 2021154739 | 8/2021 | |

OTHER PUBLICATIONS

Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Jun. 8, 2021 in U.S. Appl. No. 16/791,895.

(56) References Cited

OTHER PUBLICATIONS

Final Office Action dated Dec. 20, 2021 in U.S. Appl. No. 16/791,895.
Non-Final Office Action dated Apr. 30, 2021 in U.S. Appl. No. 16/278,608.
Non-Final Office Action dated Jul. 20, 2021 in U.S. Appl. No. 16/211,896.
Non-Final Office Action dated Jul. 26, 2021 in U.S. Appl. No. 16/630,824.
Final Office Action dated Jan. 11, 2022 in U.S. Appl. No. 16/630,824.
Non-Final Office Action dated Mar. 2, 2022 in U.S. Appl. No. 16/630,824.
Non-Final Office Action dated Aug. 24, 2021 in U.S. Appl. No. 16/657,935.
Notice of Allowance dated Oct. 20, 2021 in U.S. Appl. No. 16/820,587.
Notice of Allowance dated Nov. 10, 2021 in U.S. Appl. No. 16/211,896.
Non-Final Office Action dated May 11, 2022 in U.S. Appl. No. 16/411,048.
Non-Final Office Action dated May 6, 2022 in U.S. Appl. No. 16/855,965.
Notice of Allowance dated Feb. 4, 2022 in U.S. Appl. No. 16/644,465.
Notice of Allowance dated Mar. 7, 2022 in U.S. Appl. No. 16/644,487.
Non-Final Office Action dated Apr. 12, 2022 in U.S. Appl. No. 16/753,560.
International Search Report and Written Opinion dated Apr. 29, 2016 in Application No. PCT/US2015/061921.
International Search Report and Written Opinion dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
International Search Report and Written Opinion dated Feb. 16, 2022 in Application No. PCT/US2021/056910.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Apr. 28, 2021 in India Patent Application No. 20181704169.
Office Action dated Jul. 15, 2021 in Japanese Patent Application No. 2019-503636.
Office Action dated Jul. 29, 2021 in India Patent Application No. 202017005710.
Office Action dated Oct. 20, 2021 in Chinese Patent Application No. 201780044144.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).
ACS. (2012). A Single-Layer Atmosphere Model. Accessed on Aug. 17, 2021 at https://www.acs.org/content/acs/en/ climatescience/atmosphericwarming/singlelayermodel.html (Year: 2012).
Materials Technology. (2010). UV Exposure Across Surface of Earth. Accessed Aug. 17, 2021 at http://www.drb-mattech.co.uk/uv%20map.html (Year: 2010).

* cited by examiner

700

| 701 - Providing a central computer system |
| --- |
| ↓ |
| 702 - Providing a central database |
| ↓ |
| 703 - Providing multiple controlled devices |

| 801 - Constructing a hierarchical training data set |
| --- |
| ↓ |
| 802 - Applying machine-learning to the hierarchical training data set to determine at least one optimal control input value of a control input for a controlled device of multiple controlled devices |

| 901 - Receiving a first training data set |
| --- |
| ↓ |
| 902 - Determining that the first training data set is inadequate to fully form the hierarchical training data set |
| ↓ |
| 903 - Receiving a second training data set |
| ↓ |
| 904 - Supplementing the first training data set with the second training data set to form the hierarchical training data set |

FIG. 9

SYSTEMS FOR CONSTRUCTING HIERARCHICAL TRAINING DATA SETS FOR USE WITH MACHINE-LEARNING AND RELATED METHODS THEREFOR

CROSS-REFERENCE TO RELATED APPLICATIONS

This application is a continuation of U.S. patent application Ser. No. 16/211,896 filed on Dec. 6, 2018 entitled, "Systems for Constructing Hierarchical Training Data Sets for Use With Machine-Learning And Related Methods Therefor", claims priority to, and the benefit of, U.S. Provisional Application No. 62/595,445 filed on Dec. 6, 2017, entitled "Systems for Constructing Hierarchical Training Data Sets for Use With Machine-Learning And Related Methods Therefor." The contents of the above-identified applications are herein incorporated by reference in their entirety.

BRIEF DESCRIPTION OF THE DRAWINGS

To facilitate further description of the embodiments, the following drawings are provided in which:

FIG. 7 illustrates a flow chart for a method of providing a system, according to an embodiment;

FIG. 8 illustrates a flow chart for an embodiment of a method;

FIG. 9 illustrates a flow chart for an exemplary activity of constructing a hierarchical training data set, according to the embodiment of FIG. 8;

Figure 1:
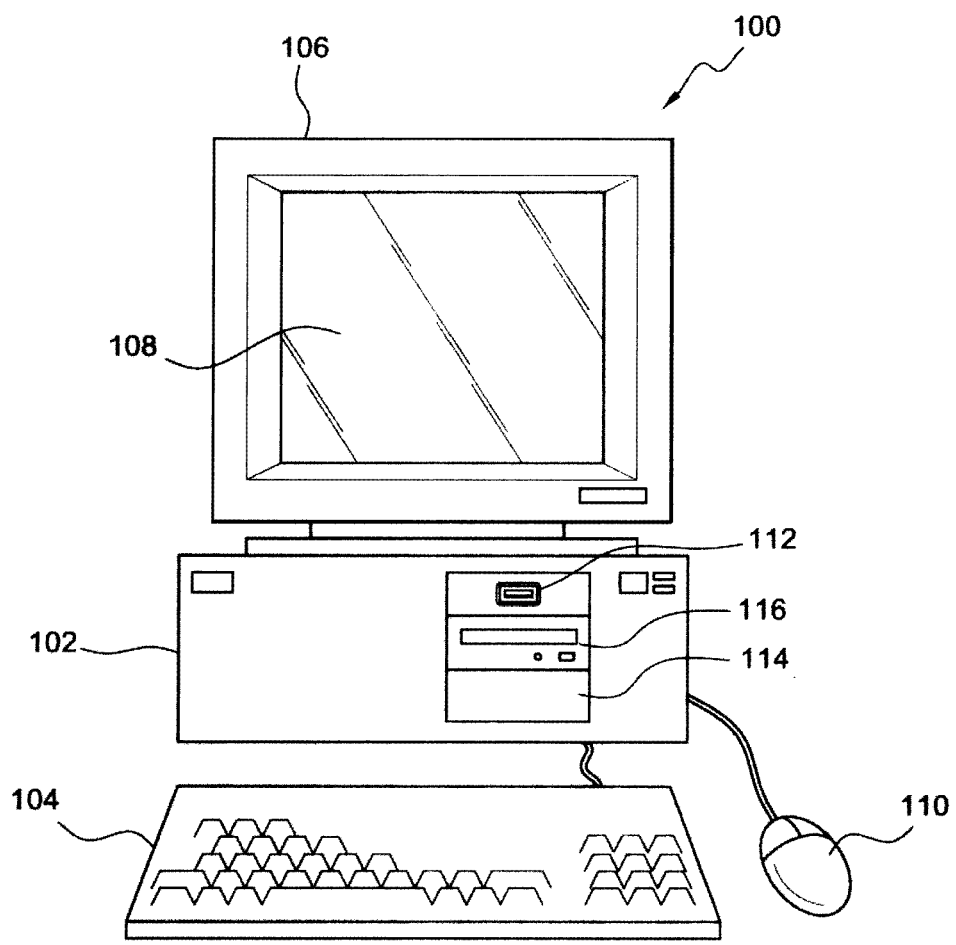
FIG. 1 illustrates a front elevational view of an exemplary computer system that is suitable to implement at least part of the system of FIG. 3, and/or to implement at least part of one or more of the activities of the method of FIG. 8 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 100 can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also can be appropriate for implementing part or all of one or more embodiments of the techniques, methods, and/or systems described herein.

In many embodiments, computer system 100 can comprise chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

Figure 2:
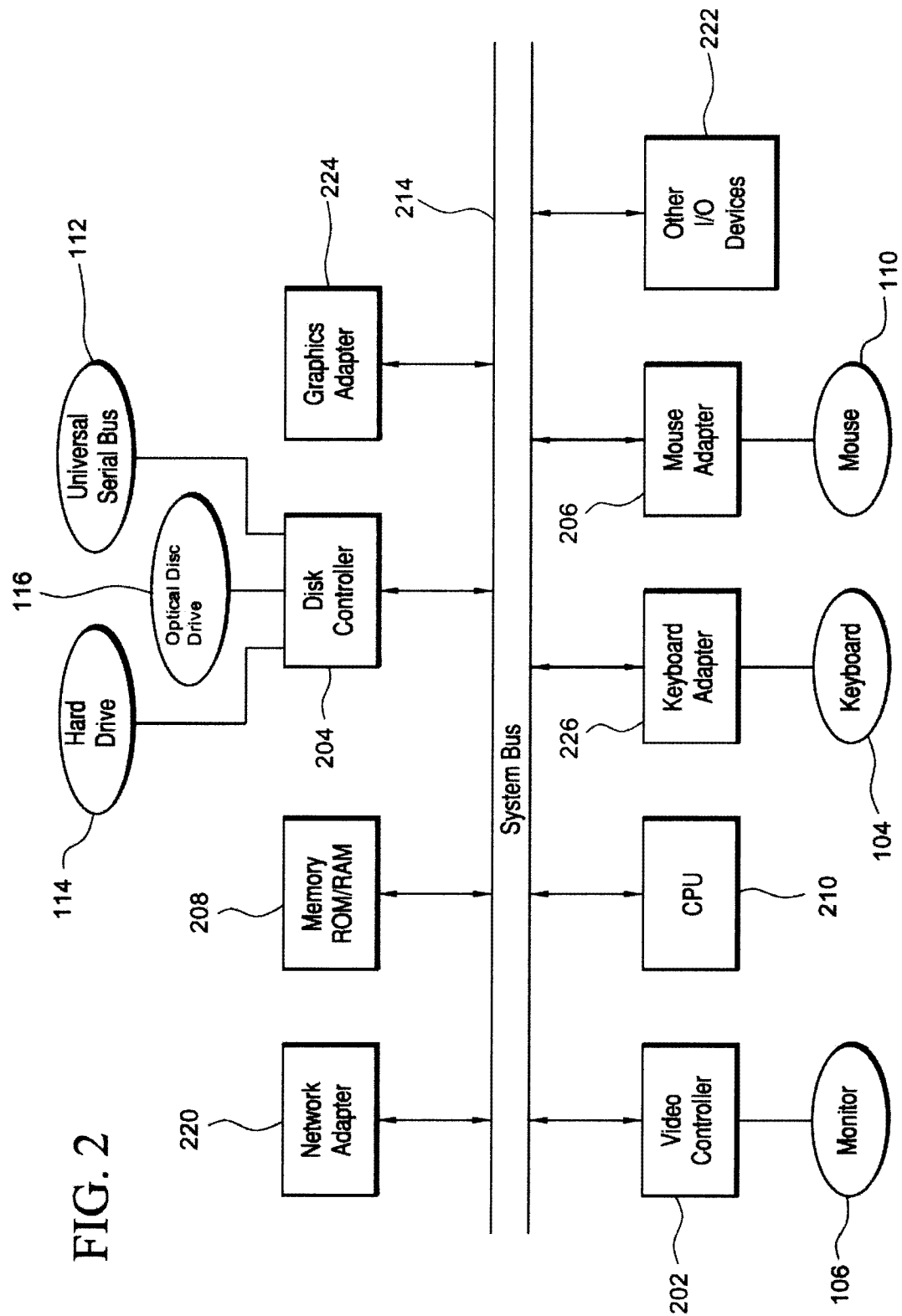
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In many embodiments, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), optical disc drive 116 (FIGS. 1 & 2), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise an embedded system.

Figure 3:
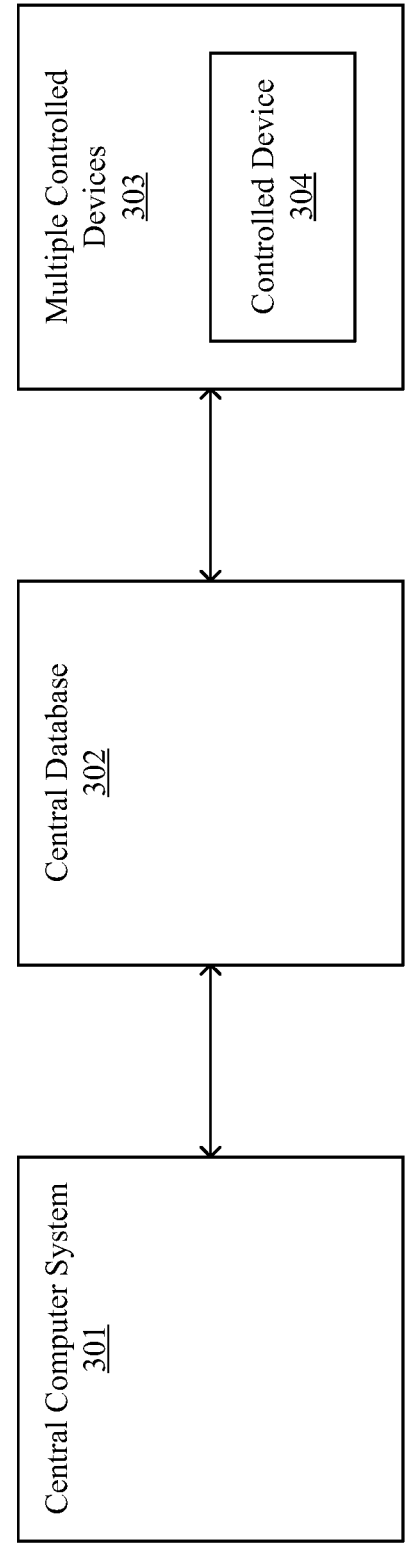
FIG. 3 illustrates a representative block diagram of a system, according to an embodiment.

Skipping ahead now in the drawings, FIG. 3 illustrates a representative block diagram of a system 300, according to an embodiment. In some embodiments, system 300 can be implemented to perform part or all of one or more methods (e.g., method 800 (FIG. 8)).

System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 is operable to construct hierarchical training data sets for use with machine-learning. For example, system 300 can determine optimal value(s) for control input(s) of multiple controlled devices 303 (e.g., controlled device 304) by constructing hierarchical training data sets for multiple controlled devices 303 (e.g., controlled device 304) and then apply machine-learning to the hierarchical training data sets to learn the optimal value(s) for the control input(s) of multiple controlled devices 303 (e.g., controlled device 304) from the hierarchical training data sets. Further, system 300 can generate training coefficients corresponding to optimal value(s) for the control input(s) of controlled device 304 (FIG. 3) that can be used by multiple controlled devices 303 (e.g., controlled device 304) to learn the optimal value(s) for the control input(s) of controlled device 304 (FIG. 3).

Also, for reasons explained in greater detail below, using hierarchical training data sets with machine-learning advantageously can permit controlled devices to be trained with data that is more applicable to particular controlled devices. For example, using hierarchical training data sets with machine-learning can reduce or minimize an extent to which data used to train a particular controlled device corresponds to different free input(s) and/or to other controlled devices having design variables, condition variables, etc.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301 and a central database 302. In some embodiments, system 300 can comprise multiple controlled devices 303. For example, multiple controlled devices 303 can comprise controlled device 304.

In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage devices) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs, and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central database 302 can comprise a structured (e.g., indexed) collection of data and can be managed by any suitable database management systems configured to define, create, query, organize, update, and manage a database. Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, central database 302 can be stored on one or more memory storage devices (e.g., non-transitory memory storage device(s)), which can be similar or identical to the one or more memory storage device(s) (e.g., non-transitory memory storage device(s)) described above with respect to computer system 100 (FIG. 1). In some embodiments, the memory storage device(s) of central computer system 301 can comprise some or all of the memory storage device(s) storing central database 302. In further embodiments, some of the memory storage device(s) storing central database 302 can be part of one or more third-party computer systems (i.e., other than central computer system 301), and in still further embodiments, all of the memory storage device(s) storing central database 302 can be part of one or more of the third-party computer system(s). Like central computer system 301, when applicable, each of the third-party computer system(s) can be similar or identical to computer system 100 (FIG. 1). Notably, the third-party computer systems are not shown at FIG. 3 in order to avoid unduly cluttering the illustration of FIG. 3, and central database 302 is illustrated at FIG. 3 apart from central computer system 301 and multiple controlled devices 303 to better illustrate that central database 302 can be stored at memory storage device(s) of central computer system 301 and/or the third-party computer system(s), depending on the manner in which system 300 is implemented.

Each of multiple controlled devices 303 can be similar to each other. For example, each of multiple controlled devices 303 can be configured to receive one or more control inputs that control the operation of multiple controlled devices 303. Further, multiple controlled devices 303 can comprise control systems operable to receive the control input(s) and use the control input(s) to control the operation of the corresponding controlled devices of multiple controlled devices 303. As explained in greater detail below, although the type or types of control input(s) can be the same for each of multiple controlled devices 303, the particular value or values of the control input(s) can be specific to the corresponding controlled device of multiple controlled devices 303, and can be the same or can vary between or among multiple controlled devices 303. As used herein, the term "control input" can, in some embodiments, refer to any suitable measurable input of a controlled device of multiple controlled devices 303 that is subject to the control of an operator of the controlled device.

Further, each of multiple controlled devices 303 can be configured to output a controlled device output. As explained in greater detail below, although the type of controlled device output can be the same for each of multiple controlled devices 303, the particular value of the controlled device output can be specific to the corresponding controlled device of multiple controlled devices 303, and can be the same or can vary between or among multiple controlled devices 303. Meanwhile, the controlled device output of a controlled device of multiple controlled devices 303 can be a function of the control input(s) of that controlled device (i.e., can depend on the control input(s) of that controlled device). As used herein, the term "controlled device output" can, in some embodiments, refer to any suitable measurable output of a controlled device of multiple controlled devices 303.

In some embodiments, the controlled device output of a controlled device of multiple controlled devices 303 can be a function of one or more free inputs of that controlled device (i.e., can depend on the free input(s) of that controlled device) in addition to the control input(s) of that controlled device. As explained in greater detail below, although the type or types of free input(s) can be the same for each of multiple controlled devices 303, the particular value or values of the free input(s) can be specific to the corresponding controlled device of multiple controlled devices 303, and can be the same or can vary between or among multiple controlled devices 303. As used herein, the term "free input" can, in some embodiments, refer to any suitable measurable input of a controlled device of multiple controlled devices 303 that is not subject to the control of an operator of the controlled device, thereby distinguishing a free input from a control input.

In many embodiments, the value(s) of the control input(s) of a controlled device of multiple controlled devices 303 can be optimized so that the controlled device outputs an optimal value of the controlled device output. For example, an optimal value of the controlled device output can comprise a minimum value, a maximum value, or any suitable particular value of the controlled device output that an operator of the controlled device of multiple controlled devices 303 may want to achieve. Meanwhile, when the controlled device output of the controlled device also is a function of one or more free inputs, the optimal value(s) of the control input(s) for a particular controlled device of multiple controlled devices 303 can be a function of the value(s) of the free input(s) of that controlled device (i.e., can depend on the value(s) of the free input(s) of that controlled device). Accordingly, variations in the value(s) of the free input(s) of multiple controlled devices 303 can cause the optimal value(s) of the control input(s) to vary between or among multiple controlled devices 303.

Further, in these or other embodiments, although each of multiple controlled devices 303 can be configured to receive the same type of control input(s), design variables in multiple controlled devices 303 can cause the optimal value(s) of the control input(s) to vary between or among multiple controlled devices 303.

For example, in some embodiments, all of multiple controlled devices 303 can be associated with a controlled device classification. Further, in some embodiments, the controlled device classification can refer to a model of multiple controlled devices 303. For purposes of illustration, in some examples, multiple controlled devices 303 can be vehicles manufactured by the Toyota Motor Corporation of Toyota, Aichi, Japan, and the model can be a 4Runner. In other examples, multiple controlled devices 303 can be vehicles manufactured by the General Motors Company of Detroit, Mich., United States of America, and the model can be a Silverado.

Meanwhile, however, in some of these embodiments, individual ones or groups of multiple controlled devices 303 may be associated with different controlled device sub-classifications of the controlled device classification. Accordingly, in these embodiments, one or more (e.g., multiple) of multiple controlled devices 303 can be distinguished from one or more (e.g., multiple) others of multiple controlled devices 303 according to their device sub-classifications. For example, one or more (e.g., multiple) of multiple controlled devices 303 can be associated with a first device sub-classification, one or more (e.g., multiple) of multiple controlled devices 303 can be associated with a second device sub-classification different than the first device sub-classification and not with the first device sub-classification, and so on. In some embodiments, the controlled device sub-classifications can refer to different versions of a model of multiple controlled devices 303. For purposes of illustration, in some embodiments, when multiple controlled devices 303 are vehicles manufactured by the Toyota Motor Corporation of Toyota, Aichi, Japan, and the model is a 4Runner, the versions can comprise the SR5, the SR5 Premium, the TRD Off-Road, the TRD Off-Road Premium, the Limited, and the TRD Pro. In other embodiments, when multiple controlled devices 303 are vehicles manufactured by the General Motors Company of Detroit, Mich., United States of America, and the model is a Silverado, the versions can comprise the 1500, the 2500, and the 3500.

In many embodiments, controlled devices of multiple controlled devices 303 being associated with different sub-classifications, despite being configured to receive the same type of control input(s) and being associated with the controlled device classification, can be implemented with different materials, different geometries, different features, or any other suitable different design variables, which may result in variations of the optimal value(s) of the optimal control input(s) corresponding to the particular controlled devices of multiple controlled devices 303. In these or other embodiments, multiple controlled devices 303 can be classified according to any suitable quantity of sub-classifications and/or with any suitable tiers of sub-classifications, depending on the different design variables applying to multiple controlled devices 303.

Further still, in many embodiments, condition variables in multiple controlled devices 303 can cause the optimal value(s) of the control input(s) to vary between or among multiple controlled devices 303. For example, even to the extent that two or more of multiple controlled devices 303 are associated with a same sub-classification, one controlled device of multiple controlled devices 303 may experience more or less wear than another controlled device of multiple controlled devices 303, may be better or worse maintained than another controlled device of multiple controlled devices 303, etc., and such condition variables may result in variations of the optimal value(s) of the optimal control input(s) corresponding to the particular controlled devices of multiple controlled devices 303.

In many embodiments, controlled device 304 can be any suitable device configured to receive control input(s) and to output a controlled device output. Meanwhile, in some of these embodiments, each other controlled device of multiple controlled devices 303 can be similar to controlled device 304. For example, in some embodiments, multiple controlled devices 303 (e.g., controlled device 304) can be water generating units.

Figure 4:
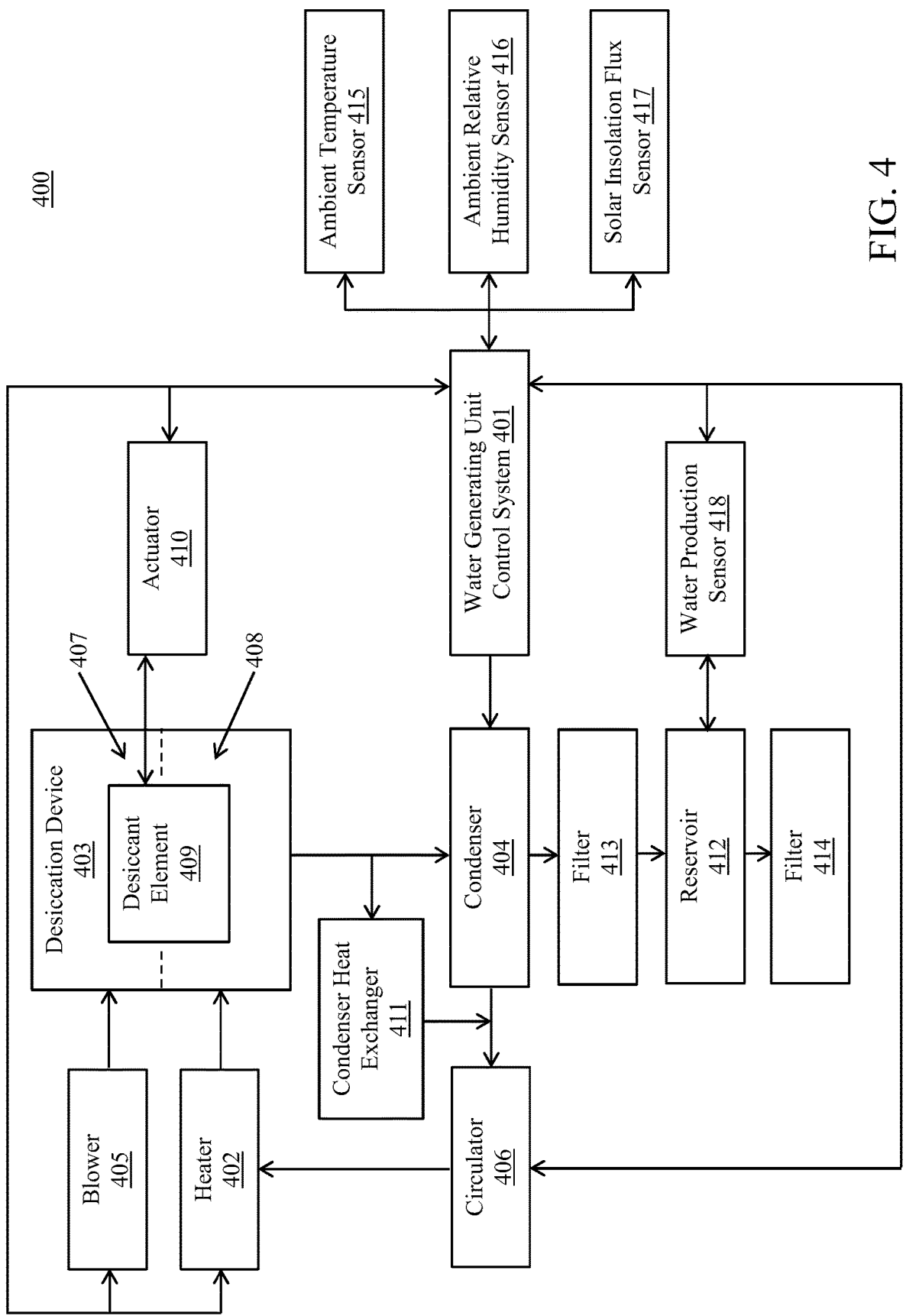
FIG. 4 illustrates a representative block diagram of a central computer system of the system of FIG. 3, according to the embodiment of FIG. 3.

Turning ahead in the drawings, FIG. 4 illustrates a representative block diagram of a water generating unit 400, according to an embodiment. In many embodiments, when controlled device 304 (FIG. 3) is a water generating unit, the water generating unit can be similar or identical to water generating unit 400.

Water generating unit 400 is merely exemplary and embodiments of the system are not limited to the embodiments presented herein. Water generating unit 400 can be employed in many different embodiments or examples not specifically depicted or described herein. In some embodiments, certain elements of water generating unit 400 can perform various methods and/or activities of those methods. In these or other embodiments, the methods and/or the activities of the methods can be performed by other suitable elements of water generating unit 400.

As explained in greater detail below, in many embodiments, water generating unit 400 can make available water to a user of water generating unit 400. In these or other embodiments, water generating unit 400 can generate water. In many embodiments, the water made available to the user of water generating unit 400 can comprise the water generated by water generating unit 400.

For example, in some embodiments, water generating unit 400 can comprise a drinking water solar panel. In further embodiments, a drinking water solar panel also can be referred to as a water-from-air solar panel.

In many embodiments, water generating unit 400 can comprise a water generating unit control system 401, a heater 402, a desiccation device 403, a condenser 404, a blower 405, and a circulator 406. Further, desiccation device 403 can comprise an adsorption zone 407, a desorption zone 408, a desiccant element 409, and an actuator 410.

In some embodiments, water generating unit 400 can comprise a condenser heat exchanger 411, a reservoir 412, a filter 413, and/or a filter 414. In other embodiments, condenser heat exchanger 411, reservoir 412, filter 413, and/or filter 414 can be omitted.

In further embodiments, water generating unit 400 can comprise an ambient temperature sensor 415, an ambient relative humidity sensor 416, a solar insolation flux sensor 417, and/or a water production sensor 418. In other embodiments, ambient temperature sensor 415, ambient relative humidity sensor 416, solar insolation flux sensor 417, and/or water production sensor 418 can be omitted.

Heater 402 can be coupled to desiccation device 403, desiccation device 403 can be coupled to condenser 404, and condenser 404 can be coupled to heater 402. In many embodiments, circulator 406 can operably move and repeatedly cycle one or more regeneration fluids from heater 402, to desiccation device 403 to condenser 404 and back to heater 402 (e.g., in a closed loop). Heater 402, desiccation device 403, and condenser 404 can be coupled together by any suitable conduits configured to transfer the regeneration fluid(s) among heater 402, desiccation device 403, and condenser 404. Exemplary regeneration fluid(s) can comprise humid air, one or more supersaturated or high relative humidity gases (e.g., a relatively humidity greater than approximately 90%), one or more glycols, one or more ionic liquids, etc.

Circulator 406 can comprise any suitable device configured to move the regeneration fluid(s) from heater 402, to desiccation device 403 to condenser 404 and back to heater 402. For example, in some embodiments, circulator 406 can comprise a pump.

In many embodiments, desiccation device 403 can receive the regeneration fluid(s) at desorption zone 408. In many embodiments, after the regeneration fluid(s) are received at desorption zone 408, the regeneration fluid(s) can be moved to condenser 404. In some of these embodiments, the regeneration fluid(s) can be moved to one or more additional desiccation devices before being moved to condenser 404, as explained below.

In many embodiments, blower 405 can move a process fluid (e.g., humid air) to desiccation device 403. For example, in some embodiments, desiccation device 403 can receive the process fluid at adsorption zone 407. Further, blower 405 can move the process fluid through desiccation device 403 (e.g., through adsorption zone 407). In some embodiments, after the process fluid is received at adsorption zone 407, the process fluid can be exhausted to the atmosphere around (e.g., adjacent to) water generating unit 400.

Blower 405 can comprise any suitable device configured to move the process fluid to desiccation device 403. For example, in some embodiments, blower 405 can comprise a pump.

In many embodiments, actuator 410 can operably move and repeatedly cycle desiccant element 409, or portions thereof, between adsorption zone 407 and desorption zone 408 to capture (e.g., absorb and/or adsorb) water from the process fluid received at adsorption zone 407 and desorb water into the regeneration fluid(s) received at desorption zone 408. For example, in some embodiments, desiccant element 409 can be disposed on a wheel located partially at adsorption zone 407 and partially at desorption zone 408. Accordingly, in these embodiments, portions of desiccant element 409 can be simultaneously located at adsorption zone 407 and at desorption zone 408, such as, for example, so that desiccant element 409 can simultaneously capture (e.g., absorb and/or adsorb) water from the process fluid received at adsorption zone 407 and desorb water into the regeneration fluid(s) received at desorption zone 408. Meanwhile, actuator 410 can operably rotate the wheel so that continuously changing portions of desiccant element 409 are located at adsorption zone 407 and at desorption zone 408 when actuator 410 rotates the wheel.

In some embodiments, desiccant element 409 can comprise any suitable material or materials configured such that desiccant element 409 can capture (e.g., absorb and/or adsorb) and desorb water. For example, the material(s) of desiccant element 409 can comprise one or more hygroscopic materials. In many embodiments, exemplary material(s) for desiccant element 409 can comprise silica, silica gel, alumina, alumina gel, montmorillonite clay, one or more zeolites, one or more molecular sieves, activated carbon, one or more metal oxides, one or more lithium salts, one or more calcium salts, one or more potassium salts, one or more sodium salts, one or more magnesium 25 salts, one or more phosphoric salts, one or more organic salts, one or more metal salts, glycerin, one or more glycols, one or more hydrophilic polymers, one or more polyols, one or more polypropylene fibers, one or more cellulosic fibers, one or more derivatives thereof, and one or more combinations thereof.

In some embodiments, desiccant element 409 can comprise any suitable form or forms configured such that desiccant element 409 can capture (e.g., absorb and/or adsorb) and desorb water. For example, desiccant element 409 can comprise a liquid form and/or a solid form. In further embodiments, desiccant element 409 can comprise a porous solid impregnated with one or more hygroscopic material(s).

In some embodiments, desiccant element 409 can be configured to capture (e.g., absorb and/or adsorb) water at one or more temperatures and/or pressures and can be configured to desorb water at one or more other temperatures and/or pressures. In some embodiments, desiccant element 409 can be implemented with material(s) and/or form(s), and/or can be otherwise configured such that desiccant element 409 does not capture (e.g., absorb and/or adsorb) one or more materials toxic to humans, pets, and/or other animals.

In many embodiments, condenser 404 can extract water from the regeneration fluid(s) received at condenser 404, such as, for example, water that has been desorbed into the regeneration fluid(s) at desorption zone 408 of desiccation device 403. In these embodiments, condenser 404 can condense water vapor from the regeneration fluid(s) into liquid water. Accordingly, in many embodiments, condenser 404 can cool the regeneration fluid(s) by extracting thermal energy from the regeneration fluid(s) in order to condense water vapor from the regeneration fluid(s) into liquid water. In some embodiments, condenser 404 can transfer thermal energy extracted from the regeneration fluid(s) to the process fluid upstream of desiccation device 403 and/or to the atmosphere around (e.g., adjacent to) water generating unit 400.

In many embodiments, water extracted from the regeneration fluid(s) received at condenser 404 can be made available to a user of water generating unit 400. In some embodiments, the water can be stored at reservoir 412, as described below.

In many embodiments, heater 402 can provide thermal energy to the regeneration fluid(s) so that the regeneration fluid(s) are heated upon arriving at desiccant device 403. For example, in order to provide thermal energy to the regeneration fluid(s), heater 402 can generate heat, can receive the regeneration fluid(s), and can apply the heat to the regeneration fluid(s). Exposing desiccant element 409 of desiccation device 403 to the heated regeneration fluid(s) at desorption zone 408 of desiccation device 403 can regenerate desiccant element 409 of desiccation device 403 by causing water to desorb from desiccant element 409 into the regeneration fluid(s), thereby permitting desiccant element 409 to absorb more water from the process fluid at adsorption zone 407.

In many embodiments, heater 402 can comprise any suitable device configured to provide thermal energy to the regeneration fluid(s). For example, in many embodiments, heater 402 can comprise a solar thermal heater. In these embodiments, the solar thermal heater can convert solar insolation to the thermal energy provided to the regeneration fluid(s).

Further, in these embodiments, heater 402 can be part of a solar panel, which can generate electricity to electrically power part or all of water generating unit 400. In these or other embodiments, part or all of water generating unit 301 can be electrically powered by any other suitable source of electricity (e.g., a battery, a fuel cell, an electric grid, etc.).

In many embodiments, reservoir 412 can store water extracted from the regeneration fluid(s) by condenser 404. Accordingly, reservoir 412 can comprise any suitable receptacle or container configured to store water. Further, reservoir 412 can be coupled to condenser 404 to receive the water extracted from the regeneration fluid(s) by condenser 404.

In many embodiments, filter 413 can be operable to filter water output by condenser 404, such as, for example, to remove one or more materials (e.g., one or more materials toxic to humans) from the water. Accordingly, filter 413 can be coupled to an output of condenser 404, such as, for example, between condenser 404 and reservoir 412. Filter 413 can comprise any suitable device configured to filter water. For example, filter 413 can comprise a carbon filter or a stainless steel frit.

In many embodiments, filter 414 can be operable to filter water output by reservoir 412, such as, for example, to remove one or more materials (e.g., one or more materials toxic to humans) from the water. Accordingly, filter 414 can be coupled to an output of reservoir 412. Filter 414 can comprise any suitable device configured to filter water. For example, filter 414 can comprise a carbon filter or a stainless steel frit. In some embodiments, filter 414 can be omitted, such as, for example, when reservoir 412 is omitted.

In many embodiments, condenser heat exchanger 411 can be operable to transfer thermal energy from the regeneration fluid(s) upstream of condenser 404 to the regeneration fluid(s) downstream of condenser 404. For example, removing thermal energy from the regeneration fluid(s) upstream of condenser 404 can help prime or pre-cool the water vapor in the regeneration fluid(s) to be condensed into liquid water at condenser 404 by reducing the regeneration fluid(s) to nearer to a temperature at which the water vapor will condense into liquid water. Meanwhile, the thermal energy extracted from the regeneration fluid(s) by condenser heat exchanger 411 can be transferred to the regeneration fluid(s) downstream of condenser 404 so that the thermal energy can heat the regeneration fluid(s) upstream of desiccation device 403. As a result, implementing condenser heat exchanger 411 can make water generating unit 400 more efficient by making use of thermal energy in the regeneration fluid(s) that would otherwise be lost to condenser 404 to heat the regeneration fluid(s) heading to desiccation device 403.

In many embodiments, ambient temperature sensor 415 can detect an ambient temperature at water generating unit 400. Accordingly, ambient temperature sensor 415 can be any suitable device configured to detect an ambient temperature at water generating unit 400. For example, in some embodiments, ambient temperature sensor 415 can comprise a thermometer.

In many embodiments, ambient relative humidity sensor 416 can detect an ambient relative humidity at water generating unit 400. Accordingly, ambient relative humidity sensor 416 can be any suitable device configured to detect an ambient relative humidity at water generating unit 400. For example, in some embodiments, ambient relative humidity sensor 416 can comprise a hygrometer.

In many embodiments, solar insolation flux sensor 417 can detect a solar insolation flux at water generating unit 400. Accordingly, solar insolation flux sensor 417 can be any suitable device configured to detect a solar insolation flux at water generating unit 400. For example, in some embodiments, solar insolation flux sensor 417 can comprise a pyranometer.

In many embodiments, water production sensor 418 can detect a quantity of water generated by water generating unit 400. Accordingly, water production sensor 418 can be any suitable device configured to detect a quantity of water generated by water generating unit 400. For example, in some embodiments, water production sensor 418 can comprise a fluid level sensor. In further embodiments, when water generating unit 400 comprises reservoir 412, water production sensor 418 can be located at reservoir 412.

In many embodiments, water generating unit control system 401 can control one or more parts of water generating unit 400. For example, in many embodiments, water generating unit control system 310 can control operation of blower 405, circulator 406 and/or actuator 410. Also, water generating unit control system 401 can control heater 402. Further, in some embodiments, water generating unit control system 401 can control operation of condenser 404, such as, for example, when condenser 404 is implemented as an active device.

For example, in some embodiments, water generating unit control system 401 can control (e.g., increase or decrease) a speed at which blower 405 moves (e.g., pumps) the process fluid. Further, in these or other embodiments, water generating unit control system 401 can control (e.g., increase or decrease) a speed at which circulator 406 moves (e.g., pumps) the regeneration fluid(s). Further still, in these or other embodiments, water generating unit control system 401 can control (e.g., increase or decrease) a speed at which actuator 410 moves (e.g., rotates) desiccant element 409.

In many embodiments, the quantity of water generated by water generating unit 400 can be a function of (i.e., can depend on) the ambient temperature at water generating unit 400, the ambient relative humidity at water generating unit 400, the solar insolation flux at water generating unit 400, the speed at which blower 405 moves (e.g., pumps) the process fluid, the speed at which circulator 406 moves (e.g., pumps) the regeneration fluid(s), and/or the speed at which actuator 410 moves (e.g., rotates) desiccant element 409. In further embodiments, water generating unit control system 401 can communicate with ambient temperature sensor 415 to receive the ambient temperature at water generating unit 400, ambient relative humidity sensor 416 to receive the ambient relative humidity at water generating unit 400, solar insolation flux sensor 417 to receive the solar insolation flux at water generating unit 400, and/or water production sensor 418 to receive a quantity of water generated by water generating unit 400. Meanwhile, water generating unit control system 401 can provide the values of the ambient temperature at water generating unit 400, the ambient relative humidity at water generating unit 400, the solar insolation flux at water generating unit 400, the speed at which blower 405 moves (e.g., pumps) the process fluid, the speed at which circulator 406 moves (e.g., pumps) the regeneration fluid(s), the speed at which actuator 410 moves (e.g., rotates) desiccant element 409, and/or the quantity of water generated by water generating unit 400 to a database to be stored. For example, the database can be similar or identical to central database 302 (FIG. 3).

In many embodiments, water generating unit control system 401 can comprise any suitable device configured to control operation of water generating unit 400. In many embodiments, water generating unit control system 401 can be similar or identical to computer system 100 (FIG. 1). In these or other embodiments, water generating unit control system 401 can be similar to central computer system 301 (FIG. 3). For example, water generating unit control system 401 can be implemented with machine-learning so that water generating unit control system 401 can be trained to control operation of water generating unit 400 in a desired manner, such as, for example, to maximize the quantity of water generated by water generating unit 400.

Further, water generating unit control system 401 can be configured to communicate with heater 402, condenser 404, blower 405, circulator 406, actuator 410, ambient temperature sensor 415, ambient relative humidity sensor 416, solar insolation flux sensor 417, and/or water production sensor 418 of water generating unit 400. Accordingly, water generating unit control system 401 can be electrically coupled to heater 402, condenser 404, blower 405, circulator 406, actuator 410, ambient temperature sensor 415, ambient relative humidity sensor 416, solar insolation flux sensor 417, and/or water production sensor 418 of water generating unit 400.

In some embodiments, water generating unit control system 401 can be located remotely from where water generating unit 400 generates water when controlling operation of water generating unit 400. However, in other embodiments, water generating unit control system 401 can be located near to or at a location where water generating unit 400 generates water when controlling operation of water generating unit 400.

Although water generating unit 400 is described with respect to one desiccation device (i.e., desiccation device 403), in some embodiments, water generating unit 400 can be modified and implemented with one or more additional desiccation devices, which can be similar or identical to desiccation device 403. In these embodiments, desiccation device 403 and the additional desiccation device(s) can be implemented in series and/or in parallel with each other, as desired.

Returning again to FIG. 3, in many embodiments, when controlled device 304 is a water generating unit and when the water generating unit is similar or identical to water generating unit 400 (FIG. 4), the control input(s) for controlled device 304 can comprise a speed at which a blower of the water generating unit moves (e.g., pumps) a process fluid of the water generating unit, a speed at which a circulator of the water generating unit moves (e.g., pumps) regeneration fluid(s) of the water generating unit, and/or a speed at which an actuator of the water generating unit moves (e.g., rotates) a desiccant element of the water generating unit. In these embodiments, the speeds of the blower, the circulator, and the actuator can be similar or identical to the speeds of blower 405 (FIG. 4), circulator 406 (FIG. 4), and actuator 410 (FIG. 4) as described above with respect to water generating unit 400 (FIG. 4). In some embodiments, the speed at which a blower of the water generating unit moves (e.g., pumps) a process fluid of the water generating unit can be omitted from the control input(s). In further embodiments, when the water generating unit comprises one or more additional desiccation devices, the control input(s) for controlled device 304 further can comprise a speed or speeds of the actuators of the additional desiccation devices.

In these or other embodiments, when controlled device 304 is a water generating unit and when the water generating unit is similar or identical to water generating unit 400 (FIG. 4), the controlled device output for controlled device 304 can comprise a quantity of water generated by the water generating unit. In these embodiments, the quantity of water generated by the water generating unit can be similar or identical to the quantity of water generated by water generating unit 400 (FIG. 4) as described above with respect to water generating unit 400 (FIG. 4). In many embodiments, optimal values of the control input(s) can correspond to values of the control input(s) that maximize the controlled device output (e.g., a quantity of water generated by the water generating unit).

In these or other embodiments, when controlled device 304 is a water generating unit and when the water generating unit is similar or identical to water generating unit 400 (FIG. 4), the free input(s) for controlled device 304 can comprise an ambient temperature at the water generating unit, an ambient relative humidity at the water generating unit, and/or a solar insolation flux at the water generating unit. In these embodiments, the ambient temperature at the water generating unit, the ambient relative humidity at the water generating unit, and/or the solar insolation flux at the water generating unit can be similar or identical to the ambient temperature at the water generating unit, the ambient relative humidity at the water generating unit, and/or the solar insolation flux at the water generating unit as described above with respect to water generating unit 400 (FIG. 4).

In these or other embodiments, when controlled device 304 is a water generating unit and when the water generating unit is similar or identical to water generating unit 400 (FIG. 4), the control system of controlled device 304 can be similar or identical to water generating unit control system 401 (FIG. 4).

In many embodiments, central computer system 301 can be configured to communicate with central database 302. For example, as explained in greater detail below, in some embodiments, central computer system 301 can receive from central database 302 values of the control input(s) and the controlled device output for multiple controlled devices 303 (e.g., controlled device 304) that are provided by multiple controlled devices 303 (e.g., controlled device 304) to central database 302 and stored at central database 302. In further embodiments, when applicable, central computer system 301 can receive from central database 302 values of the free input(s) for multiple controlled devices 303 (e.g., controlled device 304) that are provided by multiple controlled devices 303 (e.g., controlled device 304) to central database 302 and stored at central database 302. In these or other embodiments, as explained in greater detail below, central computer system 301 can provide to central database 302 one or more training coefficients for storage at central database 302. The training coefficient(s) can correspond to optimal value(s) for the control input(s) of controlled device 304 (FIG. 3) that are determined by central computer system 301 and can be configured to train the control system of controlled device 304 to learn the optimal value(s) for the control input(s) of controlled device 304 (FIG. 3).

Further, multiple controlled devices 303 (e.g., controlled device 304) can be configured to communicate with central database 302. For example, as indicated above, multiple controlled devices 303 (e.g., controlled device 304) can provide to central database 302 values of the control input(s) and the controlled device output for multiple controlled devices 303 (e.g., controlled device 304) that are stored at central database 302. In further embodiments, when applicable, multiple controlled devices 303 (e.g., controlled device 304) can provide to central database 302 values of the free input(s) for multiple controlled devices 303 (e.g., controlled device 304) that are stored at central database 302. In these or other embodiments, controlled device 304 can receive from central database 302 the training coefficient(s) provided to central database 302 by central computer system 301.

Communication between central computer system 301 and central database 302 and between multiple controlled devices 303 and central database 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of suitable wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
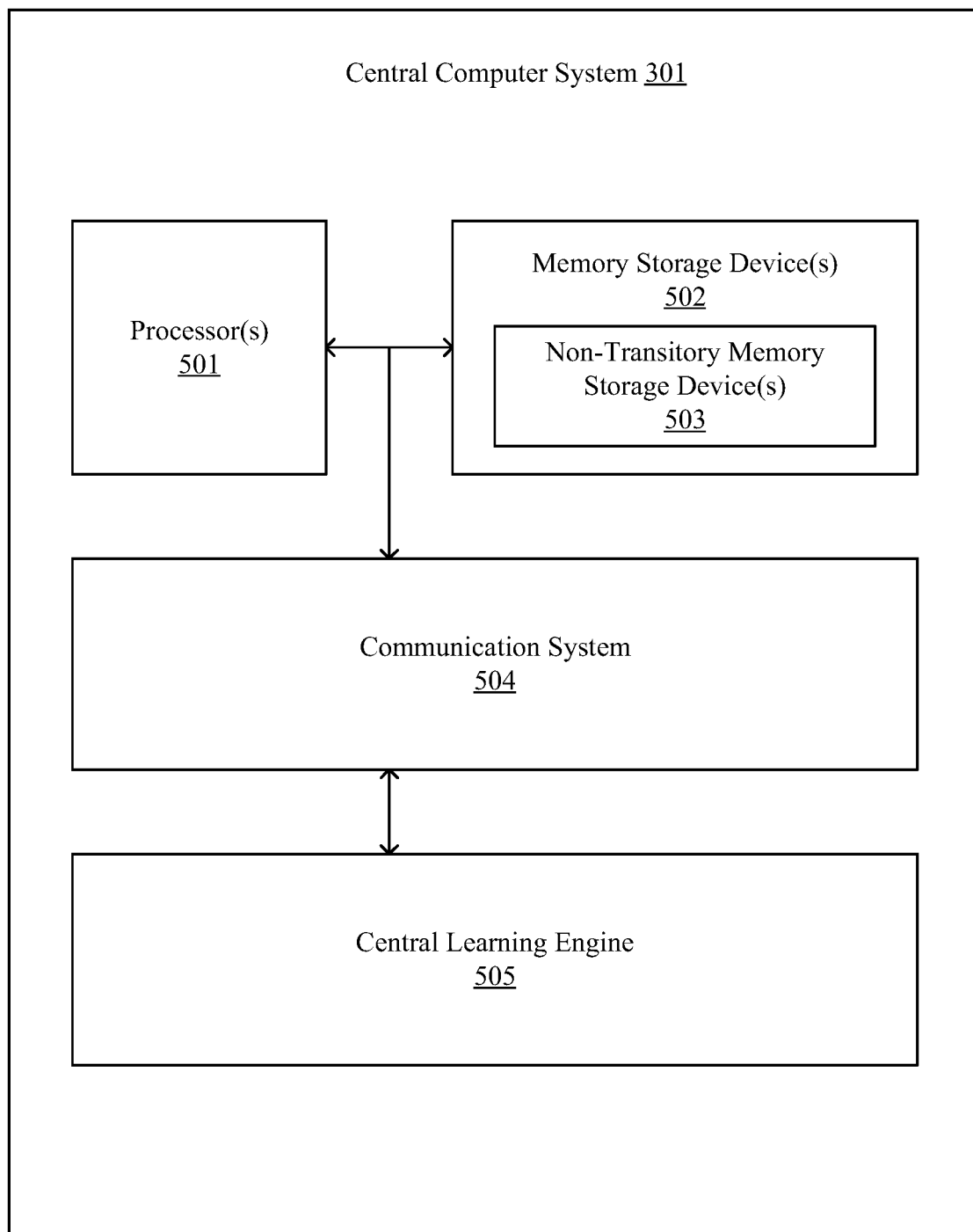
FIG. 5 illustrates a representative block diagram of a central computer system, according to the embodiment of FIG. 3.

Turning ahead now in the drawings, FIG. 5 illustrates a representative block diagram of central computer system 301, according to the embodiment of FIG. 3.

In many embodiments, central computer system 301 can comprise one or more processors 501 and one or more memory storage devices 502. Further, memory storage device(s) 502 can comprise one or more non-transitory memory storage devices 503. Meanwhile, in these or other embodiments, central computer system 301 can comprise a communication system 504 and a central learning engine 505. In some embodiments, part or all of communication system 504 can be part of central learning engine 405, and vice versa.

In many embodiments, processor(s) 501 can be similar or identical to the processor(s) described above with respect to computer system 100 (FIG. 1); memory storage device(s) 502 can be similar or identical to the memory storage device(s) described above with respect to computer system 100 (FIG. 1); and/or non-transitory memory storage device(s) 503 can be similar or identical to the non-transitory memory storage device(s) described above with respect to computer system 100 (FIG. 1). Further, communication system 504 and central learning engine 505 can be implemented with hardware and/or software, as desirable. Although communication system 504 and central learning engine 505 are shown at FIG. 5 as being separate from processor(s) 501, memory storage device(s) 502, and/or non-transitory memory storage device(s) 503, in many embodiments, part or all of communication system 504 and central learning engine 505 can be stored at memory storage device(s) 502 and/or non-transitory memory storage device(s) 503 and can be called and run at processor(s) 501, such as, for example, when the part or all of communication system 504 and central learning engine 505 are implemented as software.

In many embodiments, communication system 504 can be configured to provide and manage communication between the various elements of central computer system 301 (e.g., processor(s) 501, memory storage device(s) 502, non-transitory memory storage device(s) 503, communication system 504, central learning engine 505, etc.) and manage incoming and outgoing communications between central computer system 301 and central database 302 (FIG. 3). Like the communications between central computer system 301 (FIG. 3) and central database 302 (FIG. 3), communication system 504 can be implemented using any suitable manner of wired and/or wireless communication, and/or using any one or any combination of suitable wired and/or wireless communication network topologies and/or protocols, as described above with respect to the central computer system 301 (FIG. 3) and central database 302 (FIG. 3). In many embodiments, communication system 504 can be part of hardware and/or software implemented for communications between central computer system 301 (FIG. 3) and central database 302 (FIG. 3). For example, as applicable, communication system 504 can permit processor(s) 501 to call (i) software (e.g., at least part of central learning engine 505, etc.) stored at memory storage device(s) 502 and/or non-transitory memory storage device(s) 503, and/or (ii) data stored at memory storage device(s) 502, at non-transitory memory storage device(s) 503, and/or in central database 302 (FIG. 3).

In many embodiments, central learning engine 505 can determine optimal value(s) for the control input(s) of controlled device 304 (FIG. 3). In order to determine the optimal value(s) for the control input(s) of controlled device 304 (FIG. 3), central learning engine 505 can construct a hierarchical training data set for controlled device 304 (FIG. 3), as explained below, and then apply machine-learning to the hierarchical training data set to learn the optimal value(s) for the control input(s) of controlled device 304 (FIG. 3) from the hierarchical training data set. Further, central learning engine 405 can generate training coefficients corresponding to optimal value(s) for the control input(s) of controlled device 304 (FIG. 3) that can be stored at central database 302 and used to train the control system of controlled device 304 to learn the optimal value(s) for the control input(s) of controlled device 304 (FIG. 3).

In many embodiments, in order to construct a hierarchical training data set for controlled device 304 (FIG. 3), central learning engine 505 can receive a first training data set at central learning engine 505. The first training data set can consist of data having been generated by controlled device 304 (FIG. 3), and can include optimal value(s) of the control input(s) for controlled device 304 (FIG. 3), the controlled device output associated therewith, and when applicable, the free input(s) associated therewith.

Further, central learning engine 505 can determine if the first training data set is adequate to fully form the hierarchical training data set for controlled device 304 (FIG. 3). For example, in some embodiments, the first training data set can be adequate to fully form the hierarchical training data set when the data of the first training data set includes optimal value(s) of the control input(s) for each potential combination of the control input(s), the controlled device output, and when applicable, the free input(s) for controlled device 304 (FIG. 3). In further embodiments, the first training data set can be adequate to fully form the hierarchical training data set when the data of the first training data set includes at least a predetermined number of optimal value(s) of the control input(s) for each potential combination of the control input(s), the controlled device output, and when applicable, the free input(s) for controlled device 304 (FIG. 3). For example, as explained below, multiple optimal value(s) of the control input(s) for each potential combination of the control input(s), the controlled device output, and when applicable, the free input(s) for controlled device 304 (FIG. 3) may exist when controlled device 304 (FIG. 3) has been trained multiple times under system 300 (FIG. 3).

Accordingly, in many embodiments, central learning engine 505 can analyze the first training data set, such as, for example, using array programming, to confirm whether or not the data of the first training data set includes optimal value(s) of the control input(s) for each potential combination of the control input(s), the controlled device output, and when applicable, the free input(s) for controlled device 304 (FIG. 3). In other embodiments, central learning engine 505 can analyze the first training data set, such as, for example, using array programming, to confirm whether or not the data of the first training data set includes a predetermined number of optimal value(s) of the control input(s) for each potential combination of the control input(s), the controlled device output, and when applicable, the free input(s) for controlled device 304 (FIG. 3).

When the first training data set is adequate to fully form the hierarchical training data set for controlled device 304 (FIG. 3), central learning engine 505 can assign the first training data set as the hierarchical training data set for controlled device 304 (FIG. 3). However, when the first training data set is inadequate to fully form the hierarchical training data set for controlled device 304 (FIG. 3) (e.g., when the data of the first training data set does not include optimal value(s) of the control input(s) for each potential combination of the control input(s), the controlled device output, and when applicable, the free input(s) for controlled device 304 (FIG. 3), when the data of the first training data set does not include a predetermined number of optimal value(s) of the control input(s) for each potential combination of the control input(s), the controlled device output, and when applicable, the free input(s) for controlled device 304 (FIG. 3), etc.), central learning engine 505 can receive a second training data set. The second training data set can consist of data having been generated by two or more controlled devices of multiple controlled devices 303, including controlled device 304 (FIG. 3), and can include optimal value(s) of the control input(s) for the two or more controlled devices of multiple controlled devices 303, the controlled device output associated therewith, and when applicable, the free input(s) associated therewith. For example, in some embodiments, the two or more controlled devices of multiple controlled devices 303 can be associated with a sub-classification, as described above. In other embodiments, the two or more controlled devices of multiple controlled devices 303 can be associated with a classification, as described above.

Further, when central learning engine 505 receives the second training data set, central learning engine 505 can supplement the first training data set with the second training data set to form the hierarchical training data set. For example, central learning engine 505 can fill in missing combinations of the control input(s), the controlled device output, and when applicable, the free input(s) in the first training data set using the data in the second training data set.

In many embodiments, central learning engine 505 can continue receiving additional training data sets consisting of data having been generated by increasingly more controlled devices of multiple controlled devices 303 (FIG. 3), including controlled device 304 (FIG. 3), and supplementing earlier received training data sets until the combined training data sets are adequate to fully form the hierarchical training data set for controlled device 304 (FIG. 3) or until the received training data set consists of data having been generated by all of multiple controlled devices 303 (FIG. 3) and the combined training data sets are still inadequate to fully form the hierarchical training data set for controlled device 304 (FIG. 3). In these embodiments, when multiple tiers of sub-classifications are implemented for multiple controlled devices 303 (FIG. 3), each additional training data set can consist of data having been generated by the controlled devices of the next highest sub-classification or classification, as applicable.

When the received training data set includes data having been generated by all of multiple controlled devices 303 (FIG. 3) and the combined training data sets are still inadequate to fully form the hierarchical training data set for controlled device 304 (FIG. 3), central learning engine 505 can receive a training data set including simulated optimal value(s) of the control input(s) for each potential combination of the control input(s), the controlled device output, and when applicable, the free input(s) and can supplement the combined training data sets to fully form the hierarchical training data set for controlled device 304 (FIG. 3). For example, the training data set including simulated optimal value(s) of the control input(s) for each potential combination of the control input(s), the controlled device output, and when applicable, the free input(s) can be referred to as a simulated training data set. Notably, initially, a simulated training data set can supplement all of the hierarchical training data set because multiple controlled devices 303 (FIG. 3) will not yet have generated any data to store in central database 302 (FIG. 3).

In these or other embodiments, the potential combinations of the control input(s), the controlled device output, and when applicable, the free input(s) for the hierarchical data set for controlled device 304 (FIG. 3) can be discretized in any suitable intervals to reasonably limit the quantity of potential combinations. Further, in some embodiments, data values included in the one or more training data sets used to form the hierarchical data set for controlled device 304 (FIG. 3) that are older than a predetermined age can be treated as non-values to ensure data values in the hierarchical data set are more recent.

Figure 10:
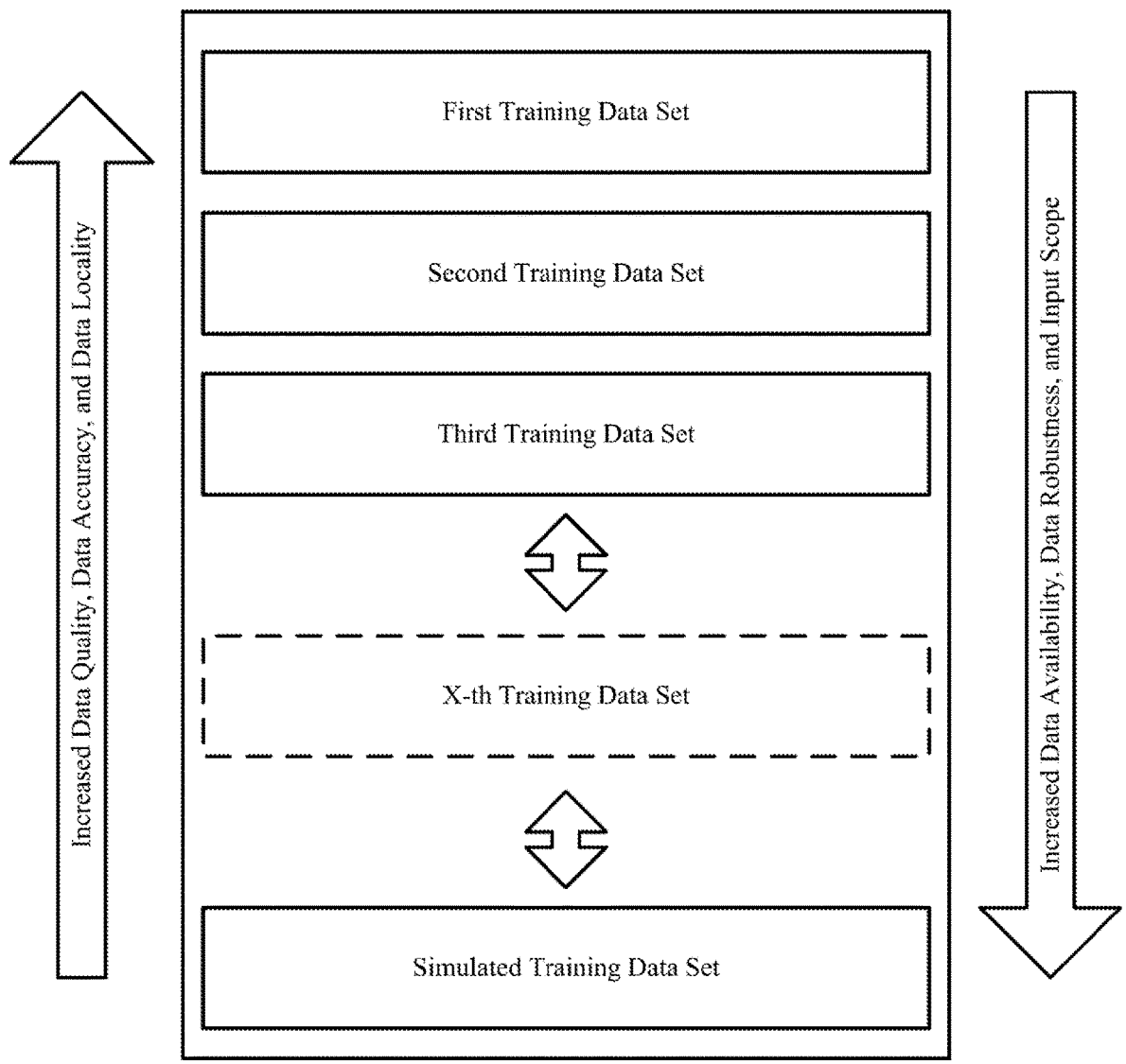
FIG. 10 is a visualization of multiple training data sets received by a central learning engine to construct a hierarchical data set.

Turning ahead in the drawings, FIG. 10 is a visualization of multiple training data sets received by a central learning engine to construct a hierarchical data set. The central learning engine can be similar or identical to central learning engine 505 (FIG. 5). Meanwhile, the hierarchical data set can be similar or identical to the hierarchical data set described above with respect to central learning engine 505 (FIG. 5), and the multiple training data sets can be similar or identical to two or more of the training data sets described above with respect to central learning engine 505 (FIG. 5). For example, the multiple training data sets can comprise a first training data set, a second training data set, a third training data set, etc. up to an x-th training data set, and a simulated training data set. Further, in many embodiments, the data of the first training data set can be included in the second training data set, the data of the first training data set and the second training data set can be included in the third training data set, etc. through to the data of each of the previous training data sets being included in the x-th training data set. As shown by FIG. 10, in some embodiments, a data quality, data accuracy, and/or data locality of the multiple training data sets can increase moving toward the first training data set and decrease moving toward the simulated training data set. Meanwhile, a data availability, data robustness, and/or input scope of the multiple training data sets can increase moving toward the simulated training data set and can decrease moving toward the first training data set. For example, input scope can refer to a range of input(s) for which relevant value(s) are available.

Referring again to FIG. 5, after constructing the hierarchical training data set for controlled device 304 (FIG. 3), central learning engine 505 can apply machine-learning to the hierarchical training data set to learn the optimal value(s) for the control input(s) of controlled device 304 (FIG. 3) from the hierarchical training data set. Although central learning engine 505 can apply any suitable form of machine-learning to the hierarchical training data set that is configured to learn the optimal value(s) for the control input(s) of controlled device 304 (FIG. 3) from the hierarchical training data set, in many embodiments, central learning engine 505 can train one or more artificial neural networks with the hierarchical training data set to learn the optimal value(s) for the control input(s) of controlled device 304 (FIG. 3). For example, in some embodiments, central learning engine 405 can implement one artificial neutral network per control input of controlled device 304 (FIG. 3).

In implementation, an artificial neural network can attempt to model a biological brain by including neurons which are connected to each other with various weights. The weight values between connections can be varied, thus permitting the artificial neural network to adapt (or learn) in response to training data (e.g., the hierarchical training data set) it receives. In feed-forward neural nets, input values are supplied at one edge and propagate through a cycle-less network to the output nodes.

In many embodiments, as indicated above, central learning engine 505 can generate training coefficients corresponding to optimal value(s) for the control input(s) of controlled device 304 (FIG. 3) that can be stored at central database 302 (FIG. 3) and used to train the control system of controlled device 304 (FIG. 3) to learn the optimal value(s) for the control input(s) of controlled device 304 (FIG. 3). In these or other embodiments, central learning engine 505 can continuously (e.g., cyclically) train the control system of controlled device 304 (FIG. 3) to learn the optimal value(s) for the control input(s) of controlled device 304 (FIG. 3) using updated values of the control input(s) and the controlled device output, and when applicable, of the free input(s) for multiple controlled devices 303 of FIG. 3 (e.g., controlled device 304 (FIG. 3)) that are generated by multiple controlled devices 303 of FIG. 3 (e.g., controlled device 304 (FIG. 3)) and provided to and stored at central database 302 (FIG. 3). For example, in some embodiments, central learning engine 505 can train the control system of controlled device 304 (FIG. 3) to learn the optimal value(s) for the control input(s) of controlled device 304 (FIG. 3) at a predetermined interval (e.g., once per day, twice, per day, etc.).

In many embodiments, the control system of controlled device 304 (FIG. 3) can implement a perturbation system configured to cause the control system of controlled device 304 (FIG. 3) to operate controlled device 304 (FIG. 3) with one or more values of the control input(s) of controlled device 304 (FIG. 3) other than the optimal value(s) learned by the control system of controlled device 304 (FIG. 3). For example, the other value(s) of the control input(s) of controlled device 304 (FIG. 3) can be near to but different than the optimal value(s) learned by the control system of controlled device 304 (FIG. 3) to generate additional data that may improve the optimal value(s) learned by the control system of controlled device 304 (FIG. 3) in future cycles. The perturbation system can implement any suitable weight perturbation learning algorithm(s) configured to cause the control system of controlled device 304 (FIG. 3) to operate controlled device 304 (FIG. 3) with one or more values of the control input(s) of controlled device 304 (FIG. 3) other than the optimal value(s) learned by the control system of controlled device 304 (FIG. 3).

For simplicity and clarity of illustration, the functionality of central learning system 505 is described herein as it relates particularly to controlled device 304 (FIG. 3) of multiple controlled devices 303 (FIG. 3), but in many embodiments, the functionality of central learning system 505 can be implemented for one or more all other controlled devices of multiple controlled devices 303 (FIG. 3), at the same or different times. Further, the functionality of central learning system 505 is described herein as it relates particularly to multiple controlled devices 303 (FIG. 3) having one controlled device output, but in many embodiments, the functionality of central learning system 505 can be extended to embodiments of multiple controlled devices 303 (FIG. 3) having multiple controlled device outputs with control input(s), and, in some embodiments, free input(s) corresponding thereto.

Figure 11:
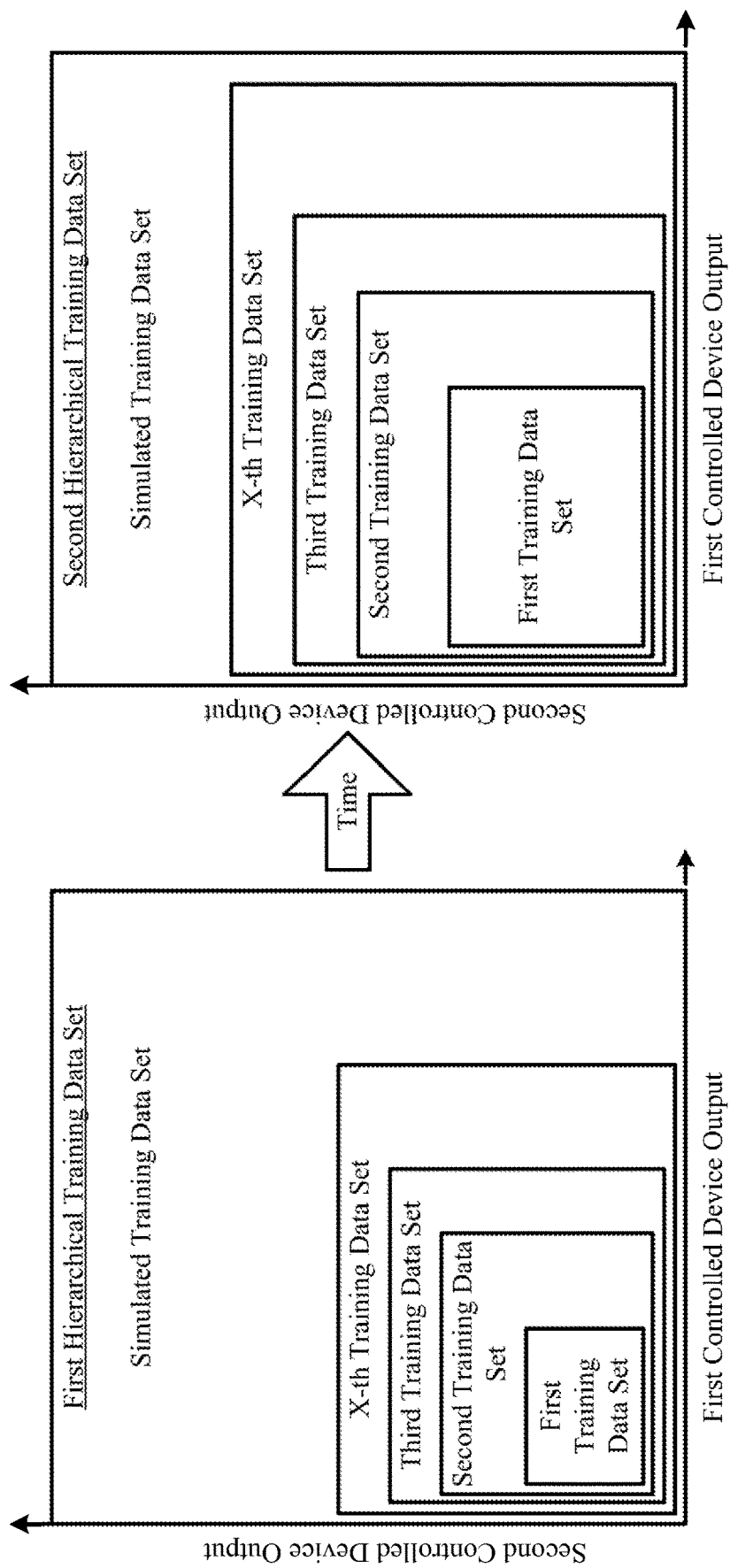
FIG. 11 is a visualization of a first hierarchical training data set and a second hierarchical training data set constructed by a central learning engine receiving multiple training data sets corresponding to two controlled device outputs.

Turning ahead in the drawings, FIG. 11 is a visualization of a first hierarchical training data set and a second hierarchical training data set constructed by a central learning engine receiving multiple training data sets corresponding to two controlled device outputs (i.e., a first controlled device output and a second controlled device output). The central learning engine can be similar or identical to central learning engine 505 (FIG. 5), and the second hierarchical training data set is constructed by the central learning engine later in time than the first hierarchical training data set. Meanwhile, the first hierarchical data set and the second hierarchical training data set each can be similar or identical to the hierarchical data set described above with respect to central learning engine 505 (FIG. 5), and the multiple training data sets can be similar or identical to two or more of the training data sets described above with respect to central learning engine 505 (FIG. 5). For example, the multiple training data sets can comprise a first training data set, a second training data set, a third training data set, etc. up to an x-th training data set, and a simulated training data set. As shown by FIG. 11, in some embodiments, a portion of the second hierarchical training data set made up of by values of the first training data set through the x-th training data set can be greater than for the first hierarchical training data set, and a portion of the second hierarchical training data set made up of by values of the simulated training data set can be less than for the first hierarchical training data set. Likewise, one or more portions of the second hierarchical training data set made up of by values of one or more of the multiple training data sets can be greater than for the first hierarchical training data set.

Figure 6:
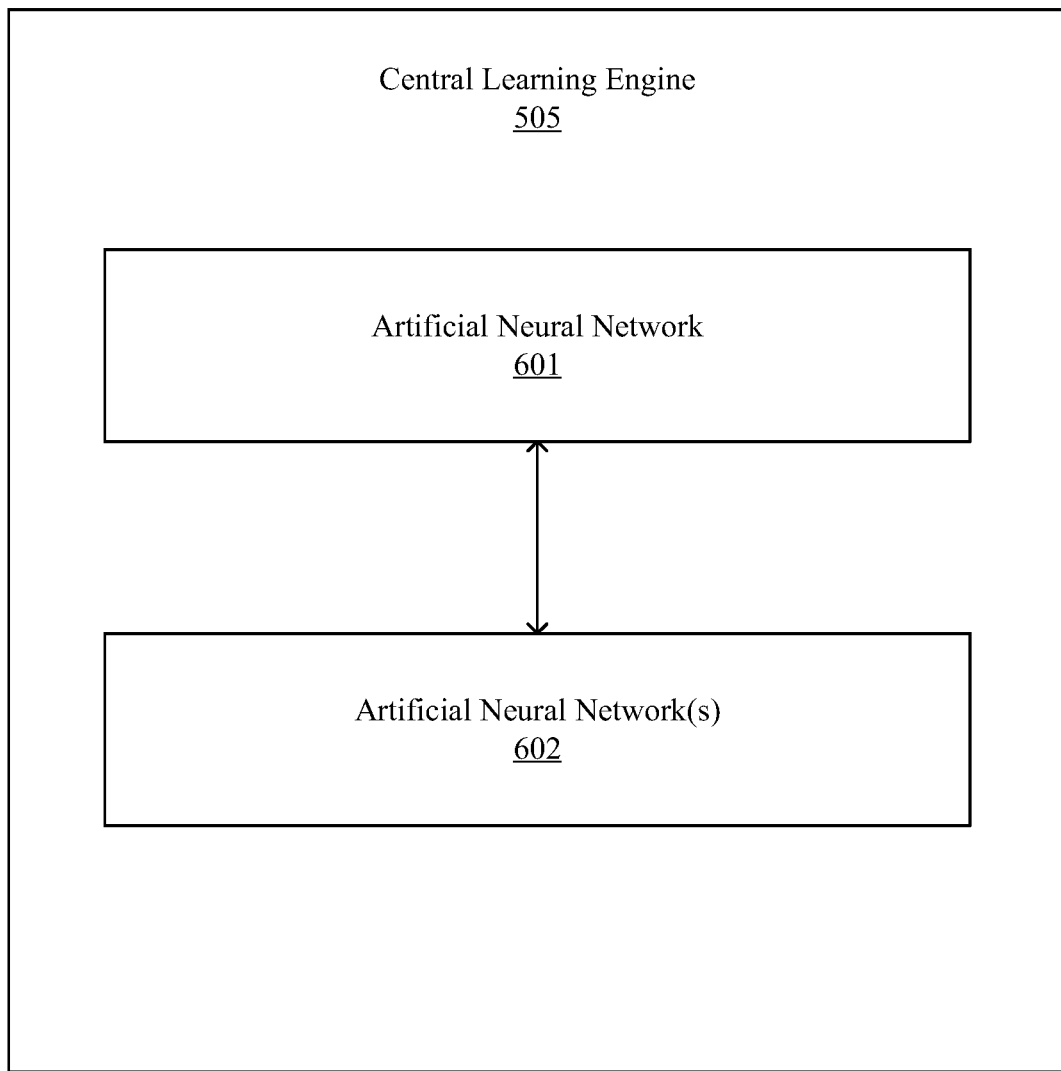
FIG. 6 illustrates a representative block diagram of a central learning engine of the central computer system of FIG. 3.

Turning back now in the drawings, FIG. 6 illustrates a representative block diagram of central learning engine 505, according to the embodiment of FIG. 3.

In many embodiments, central learning engine 505 can comprise artificial neural network 601 and one or more artificial neural networks 602. Further, artificial neural network 601 can be configured to communicate with artificial neural network(s) 602.

In many embodiments, artificial neural network 601 can receive all available value(s) stored at central database 302 (FIG. 3) of the control input(s) for all of multiple controlled devices 303 (FIG. 3), the controlled device output associated therewith, and when applicable, the free input(s) associated therewith. For example, in some embodiments, artificial neural network 601 can retrieve these values from central database 302 (FIG. 3). Then, artificial neural network 601 can determine the optimal value(s) of the control input(s) for all of multiple controlled devices 303 (FIG. 3), the controlled device output associated therewith, and when applicable, the free input(s) associated therewith by applying machine-learning to learn the optimal value(s) of the control input(s) for all of multiple controlled devices 303 (FIG. 3), the controlled device output associated therewith, and when applicable, the free input(s) associated therewith.

After artificial neural network 601 determines the optimal value(s) of the control input(s) for all of multiple controlled devices 303 (FIG. 3), the controlled device output associated therewith, and when applicable, the free input(s) associated therewith, artificial neural network(s) 602 can retrieve hierarchical data sets for each of multiple controlled devices 303 (FIG. 3) using the optimal value(s) of the control input(s), the controlled device output associated therewith, and when applicable, the free input(s) associated therewith determined by artificial neural network 601. Then, artificial neural network(s) 602 can determine the optimal value(s) of the control input(s) for the particular controlled devices of multiple controlled devices 303 (FIG. 3), the controlled device output associated therewith, and when applicable, the free input(s) associated therewith by applying machine-learning to learn the optimal value(s) of the control input(s) for the particular controlled devices of multiple controlled devices 303 (FIG. 3), the controlled device output associated therewith, and when applicable, the free input(s) associated therewith.

Referring back to FIG. 3, as indicated above, by using hierarchical training data sets with machine-learning, system 300 advantageously can permit multiple controlled devices 303 to be trained with data that is more applicable to particular controlled devices of multiple controlled devices 303. For example, as described above, construction of a hierarchical training data set for a controlled device of multiple controlled devices 303 can first favor data having been directly generated by the controlled device. Accordingly, anomalies in the data resulting from differing free input(s), design variables, condition variables, etc. can be minimized. To the extent insufficient data having been directly generated by the controlled device is not available, using data from controlled devices of multiple controlled devices 303 associated with a similar sub-classification (e.g., version) may at least minimize anomalies in the data resulting from design variables. Meanwhile, even to the extent insufficient data exists from controlled devices of multiple controlled devices 303 associated with a similar sub-classification (e.g., version), using real values generated by multiple controlled devices 303 may still be more favorable (e.g., more accurate) than relying on simulated values. For at least these reasons, system 300 can specifically and unconventionally improve the ability of a computer system to implement machine-learning to train multiple controlled devices by using data that is more applicable to particular controlled devices of multiple controlled devices.

Turning ahead now in the drawings, FIG. 7 illustrates a flow chart for an embodiment of a method 700 of providing (e.g., manufacturing) a system. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of the method 700 can be performed in any other suitable order. In still other embodiments, one or more of the activities in method 700 can be combined or skipped. In many embodiments, the system can be similar or identical to system 300 (FIG. 3).

In many embodiments, method 700 can comprise activity 701 of providing a central computer system. For example, the central computer system can be similar or identical to central computer system 301 (FIG. 3).

In many embodiments, method 700 can comprise activity 702 of providing a central database. For example, the central database can be similar or identical to central database 302 (FIG. 3).

In some embodiments, method 700 can comprise activity 703 of providing multiple controlled devices. For example, the multiple controlled devices can be similar or identical to multiple controlled devices 303 (FIG. 3). In other embodiments, activity 703 can be omitted.

Turning ahead now in the drawings, FIG. 8 illustrates a flow chart for an embodiment of a method 800. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of the method 800 can be performed in any other suitable order. In still other embodiments, one or more of the activities in method 800 can be combined or skipped.

In many embodiments, method 800 can be implemented via execution of computer instructions configured to run at one or more processors and configured to be stored at one or more non-transitory memory storage devices. In some embodiments, the processor(s) can be similar or identical to the processor(s) described above with respect to computer system 100 (FIG. 1), and/or the non-transitory memory storage device(s) can be similar or identical to the non-transitory memory storage device(s) described above with respect to computer system 100 (FIG. 1). Further, the processor(s) and/or non-transitory memory storage device(s) can be part of a central computer system, which can be similar or identical to central computer system 301 (FIG. 3).

In many embodiments, method 800 can comprise activity 801 of constructing a hierarchical training data set. FIG. 9 illustrates a flow chart for an exemplary activity 801, according to the embodiment of FIG. 8.

In many embodiments, activity 801 can comprise activity 901 of receiving a first training data set. In some embodiments, performing activity 901 can be similar or identical to receiving the first training data set as described above with respect to central learning engine 505 (FIG. 5). In these or other embodiments, the first training data set can be similar or identical to the first training data set described above with respect to central learning engine 505 (FIG. 5).

In many embodiments, activity 801 can comprise activity 902 of determining that the first training data set is inadequate to fully form the hierarchical training data set. In some embodiments, performing activity 902 can be similar or identical to determining that the first training data set is inadequate to fully form the hierarchical training data set as described above with respect to central learning engine 505 (FIG. 5).

In many embodiments, activity 801 can comprise activity 903 of receiving a second training data set. In some embodiments, performing activity 903 can be similar or identical to receiving the second training data set as described above with respect to central learning engine 505 (FIG. 5). In these or other embodiments, the second training data set can be similar or identical to the second training data set described above with respect to central learning engine 505 (FIG. 5).

In many embodiments, activity 801 can comprise activity 904 of supplementing the first training data set with the second training data set to form the hierarchical training data set. In some embodiments, performing activity 904 can be similar or identical to supplementing the first training data set with the second training data set to form the hierarchical training data set as described above with respect to central learning engine 505 (FIG. 5).

In many embodiments, activities 902-904 can be repeated one or more times with respect to one or more additional training data sets. In some embodiments, the additional training data set(s) can be similar or identical to the additional training data set(s) described above with respect to central learning engine 505 (FIG. 5). In other embodiments, activities 902-904 can be performed only for the second training data set.

In these or other embodiments, activities 902-904 can be repeated with respect to a simulated training data set. In some embodiments, the simulated training data set can be similar or identical to the training data set consisting of simulated data described above with respect to central learning engine 505 (FIG. 5). As indicated above, in other embodiments, activities 902-904 can be performed only for the second training data set.

Referring now back to FIG. 8, in many embodiments, method 800 can comprise activity 802 of applying machine-learning to the hierarchical training data set to determine at least one optimal control input value of a control input for a controlled device of multiple controlled devices. In some embodiments, performing activity 802 can be similar or identical to applying machine-learning to the hierarchical training data set to determine at least one optimal control input value of a control input for a controlled device of multiple controlled devices as described above with respect to central learning engine 505 (FIG. 5). Further, the control input can be similar or identical to one of the control input(s) as described above with respect to system 300 (FIG. 3), and the multiple controlled devices can be similar or identical to multiple controlled devices 303 (FIG. 3).

In many embodiments, activity 802 can be repeated one or more times with respect to one or more other control inputs for the controlled device of the multiple controlled devices. In further embodiments, method 800 can be repeated one or more times with respect to one or more or all other controlled devices of the multiple controlled devices.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within central computer system 301 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a processor; and
   a tangible, non-transitory memory configured to communicate with the processor,
   the tangible, non-transitory memory having instructions stored thereon that, in response to execution by the processor, cause the processor to perform operations comprising:
   receiving a first training data set comprising first training data having been generated by a first controlled device;
   determining that the first training data set is inadequate to fully form a hierarchical training data set such that the first training data set does not include a first optimal control input value of a first control input for each potential combination of controlled device inputs and controlled device outputs;
   receiving a second training data set comprising second training data having been generated by the first controlled device and a second controlled device;
   receiving first free inputs of the first controlled device and second free inputs of the second controlled device, wherein the first free inputs and the second free inputs are respective measurable inputs of the first controlled device and the second controlled device that are not subject to the control of an operator of the first controlled device and the second controlled device;
   supplementing the first training data set with the second training data set to fill in missing combinations of the controlled device inputs, the controlled device outputs, the first free inputs and the second free inputs in the first training data set and to form the hierarchical training data set;
   supplementing the hierarchical training data set with simulated optimal values of the controlled device inputs, the controlled device outputs, the first free inputs and the second free inputs, in response to the first training data set with the second training data set being inadequate;
   training a neural network using the hierarchical training data set to determine the first optimal control input value of the first control input for the first controlled device of multiple controlled devices;
   wherein the multiple controlled devices comprise the first controlled device and the second controlled device;
   using the hierarchical training data set with the trained neural network, the controlled device inputs, the first free inputs and the second free inputs to determine the controlled device outputs, and
   implementing a perturbation system configured to cause a control system of the first controlled device to operate the first controlled device with values of the first control input other than the first optimal control input value of the first control input.

2. The system of claim 1, wherein the multiple controlled devices further comprise a third controlled device and a fourth controlled device.

3. The system of claim 1, wherein the first controlled device is associated with a first controlled device classification.

4. The system of claim 1, wherein the second controlled device is associated with a second controlled device classification.

5. The system of claim 1, wherein the multiple controlled devices further comprise a third controlled device, and wherein the third controlled device is not associated with a first controlled device classification.

6. The system of claim 1, wherein the multiple controlled devices further comprise a fourth controlled device, and wherein the fourth controlled device is associated with a first controlled device classification but not associated with a second controlled device classification.

7. The system of claim 1, further comprising determining, by using array programming, that the first training data set includes the first optimal control input value of a first control input.

8. The system of claim 1, wherein the multiple controlled devices further comprise a third controlled device and a fourth controlled device, and further comprising:
 determining that the first training data set and the second training data set are inadequate to fully form the hierarchical training data set such that the first training data set and the second training data set do not include the first optimal control input value of the first control input for each potential combination of controlled device inputs and controlled device outputs;
 receiving a third training data set comprising third training data having been generated by all of the multiple controlled devices; and
 supplementing the first training data set and the second training data set with the third training data set to form the hierarchical training data set.

9. The system of claim 1, wherein the controlled device outputs are different for each of the multiple controlled devices.

10. The system of claim 9, wherein a first of the controlled device outputs of the first controlled device comprises a quantity of water generated by the first water generating unit, and wherein the first optimal control input value corresponds to a maximum quantity of water generated by the first water generating unit.

11. The system of claim 9, wherein each of the multiple water generating units comprises at least one sensor configured to detect at least one of: an ambient temperature at the first water generating unit, an ambient humidity at the first water generating unit, a solar insolation flux at the first water generating unit, a quantity of water generated by the first water generating unit, a rate of movement of a process fluid, a rate of movement of a regeneration fluid, and a rate of exposure of a regeneration fluid to a desiccant.

12. The system of claim 9, wherein the controlled device outputs is a function of the first free inputs and the second free inputs comprising one or more of: an ambient temperature at the first water generating unit, an ambient relative humidity at the first water generating unit, and a solar insolation flux at the first water generating unit.

13. The system of claim 1, wherein the first optimal control input value of a first control input varies between the multiple controlled devices due to design variables in the multiple controlled devices.

14. The system of claim 9, wherein the first controlled device is associated with a first controlled device classification and the second controlled device is associated with a second controlled device classification different than the first controlled device classification;
 wherein the first controlled device classification and the second controlled device classification are associated with one or more design variables associated with the first water generating unit including one or more of: a hygroscopic material and a system geometry;
 wherein the first optimal control input value of the first control input corresponds to a maximum quantity of water generated by the first water generating unit, and a second optimal control input value of a second control input corresponds to a maximum quantity of water generated by a second water generating unit; and,
 wherein the first optimal control input value of the first control input varies from the second optimal control input value of the second control input.

15. The system of claim 1, wherein training coefficients correspond to the first optimal control input value of the first control input, and wherein training coefficients are configured to train a control system of the first control device to learn the first optimal control input value of the first control input of the first control device.

16. The system of claim 15, wherein the communication system is configured to perform an operation comprising at least one of:
 transmit a value of the first control input;
 transmit a value of a first controlled output;
 transmit a value of a free input of the multiple controlled devices;
 transmit one or more training coefficients for storage at the central database, wherein the one or more training coefficients correspond to the first optimal control input value of the first control input.

17. The system of claim 1, wherein an optimal value of the controlled device outputs comprise at least one of a minimum value, a maximum value, or a desired value.

18. A method being implemented via execution of computer instructions configured to run on one or more processors and configured to be stored at on one or more non-transitory memory storage devices, the method comprising:
 receiving a first training data set comprising first training data having been generated by a first controlled device;
 determining that the first training data set is inadequate to fully form a hierarchical training data set such that the first training data set does not include a first optimal control input value of a first control input for each potential combination of controlled device inputs and controlled device outputs;
 receiving a second training data set comprising second training data having been generated by the first controlled device and a second controlled device;
 receiving first free inputs of the first controlled device and second free inputs of the second controlled device, wherein the first free inputs and the second free inputs are respective measurable inputs of the first controlled device and the second controlled device that are not subject to the control of an operator of the first controlled device and the second controlled device;
 supplementing the first training data set with the second training data set to fill in missing combinations of the controlled device inputs, the controlled device outputs, the first free inputs and the second free inputs in the first training data set and to form the hierarchical training data set;
 supplementing the hierarchical training data set with simulated optimal values of the controlled device inputs, the controlled device outputs, the first free inputs and the second free inputs, in response to the first training data set with the second training data set being inadequate;
 training a neural network using the hierarchical training data set to determine the first optimal control input value of the first control input for the first controlled device of multiple controlled devices;
 wherein the multiple controlled devices comprise the first controlled device and the second controlled device;
 using the hierarchical training data set with the trained neural network, the controlled device inputs, the first free inputs and the second free inputs to determine the controlled device outputs; and causing, using a perturbation system, a control system of the first controlled device to operate the first controlled device with values of the first control input other than the first optimal control input value of the first control input.

\* \* \* \* \*